United States Patent
Shapira et al.

(10) Patent No.: US 7,751,353 B2
(45) Date of Patent: Jul. 6, 2010

(54) DEVICE, SYSTEM AND METHOD OF SECURING WIRELESS COMMUNICATION

(75) Inventors: Nir Shapira, Raanana (IL); Gilad Rozen, Ra'anana (IL)

(73) Assignee: Celeno Communications (Israel) Ltd., Ra'anana (IL)

(*) Notice: Subject to any disclaimer, the term of this patent is extended or adjusted under 35 U.S.C. 154(b) by 656 days.

(21) Appl. No.: 11/386,879

(22) Filed: Mar. 23, 2006

(65) Prior Publication Data

US 2007/0153714 A1    Jul. 5, 2007

Related U.S. Application Data

(63) Continuation-in-part of application No. 11/319,526, filed on Dec. 29, 2005.

(51) Int. Cl.
*H04B 7/00* (2006.01)

(52) U.S. Cl. .................. 370/310; 370/328; 370/338; 370/348; 455/273; 455/522

(58) Field of Classification Search .......... 370/310, 370/466, 445, 338, 347, 328, 348; 375/340
See application file for complete search history.

(56) References Cited

U.S. PATENT DOCUMENTS

| | | | |
|---|---|---|---|
| 5,864,548 A | 1/1999 | Liu | |
| 6,166,667 A | 12/2000 | Park | |
| 6,563,858 B1 | 5/2003 | Fakatselis et al. | |
| 6,873,293 B2 | 3/2005 | Proctor, Jr. et al. | |
| 6,895,258 B1 | 5/2005 | Scherzer et al. | |
| 6,928,047 B1 | 8/2005 | Xia | |
| 6,940,843 B2 | 9/2005 | Goodall et al. | |
| 6,961,545 B2 | 11/2005 | Tehrani et al. | |
| 6,970,682 B2 | 11/2005 | Crilly, Jr. et al. | |
| 6,999,430 B2 | 2/2006 | Holtzman et al. | |
| 7,034,759 B2 | 4/2006 | Proctor, Jr. et al. | |
| 7,039,090 B2 | 5/2006 | Boetzel et al. | |
| 7,039,137 B1 | 5/2006 | Lauterjung et al. | |
| 7,050,402 B2 | 5/2006 | Schmidl et al. | |
| 7,088,671 B1 | 8/2006 | Monsen | |
| 7,099,380 B1 | 8/2006 | Feng et al. | |
| 7,103,326 B2 | 9/2006 | Wu et al. | |
| 7,120,468 B1 | 10/2006 | Wilhoyte et al. | |
| 7,139,321 B2 | 11/2006 | Giannakis et al. | |
| 7,139,323 B2 | 11/2006 | Erving et al. | |
| 7,149,254 B2 | 12/2006 | Sampath | |
| 7,289,585 B2 | 10/2007 | Sandhu et al. | |
| 7,319,888 B2 | 1/2008 | Li et al. | |

(Continued)

OTHER PUBLICATIONS

Tse et al., "Fundamentals of Wireless Communication", Sep. 10, 2004, pp. 523-548, Cambridge University Press.

(Continued)

*Primary Examiner*—Charles N Appiah
*Assistant Examiner*—Michael T Vu
(74) *Attorney, Agent, or Firm*—Pearl Cohen Zedek Latzer, LLP

(57) ABSTRACT

Some demonstrative embodiments of the invention include methods, devices and/or systems to secure a wireless transmission. The method may include, for example, transmitting a noise transmission to be received by one or more destinations other than an intended destination of a packet during a time period corresponding to a duration of the packet. Other embodiments are described and claimed.

17 Claims, 4 Drawing Sheets

U.S. PATENT DOCUMENTS

| | | | |
|---|---|---|---|
| 2002/0041635 A1 | 4/2002 | Ma et al. | |
| 2002/0061031 A1* | 5/2002 | Sugar et al. | 370/466 |
| 2002/0097780 A1 | 7/2002 | Odenwalder et al. | |
| 2002/0146981 A1* | 10/2002 | Saint-Hilaire et al. | 455/41 |
| 2002/0150168 A1 | 10/2002 | Crawford | |
| 2002/0160737 A1 | 10/2002 | Crawford | |
| 2002/0181546 A1 | 12/2002 | Odenwalder et al. | |
| 2002/0188750 A1 | 12/2002 | Li | |
| 2003/0112901 A1* | 6/2003 | Gupta | 375/340 |
| 2003/0128658 A1 | 7/2003 | Walton et al. | |
| 2003/0139196 A1 | 7/2003 | Medvedev et al. | |
| 2004/0125820 A1 | 7/2004 | Rios | |
| 2004/0258012 A1 | 12/2004 | Ishii | |
| 2005/0025042 A1 | 2/2005 | Hadad | |
| 2005/0025176 A1 | 2/2005 | Ko et al. | |
| 2005/0030929 A1* | 2/2005 | Swier et al. | 370/338 |
| 2005/0047322 A1 | 3/2005 | Sondur | |
| 2005/0047384 A1 | 3/2005 | Wax et al. | |
| 2005/0058217 A1 | 3/2005 | Sandhu et al. | |
| 2005/0063408 A1 | 3/2005 | Famolari | |
| 2005/0105629 A1 | 5/2005 | Hottinen et al. | |
| 2005/0124369 A1 | 6/2005 | Attar et al. | |
| 2005/0135284 A1 | 6/2005 | Nanda et al. | |
| 2005/0136933 A1 | 6/2005 | Sandhu et al. | |
| 2005/0141412 A1 | 6/2005 | Sadri et al. | |
| 2005/0147023 A1 | 7/2005 | Stephens et al. | |
| 2005/0152324 A1 | 7/2005 | Benveniste | |
| 2005/0169232 A1* | 8/2005 | Sakoda et al. | 370/347 |
| 2005/0233709 A1 | 10/2005 | Gardner et al. | |
| 2005/0255892 A1 | 11/2005 | Wong et al. | |
| 2005/0286474 A1 | 12/2005 | van Zelst et al. | |
| 2006/0023803 A1 | 2/2006 | Perlman et al. | |
| 2006/0030364 A1 | 2/2006 | Olesen et al. | |
| 2006/0039312 A1 | 2/2006 | Walton et al. | |
| 2006/0062189 A1 | 3/2006 | Takeuchi | |
| 2006/0067421 A1 | 3/2006 | Walton et al. | |
| 2006/0078059 A1 | 4/2006 | Ok et al. | |
| 2006/0092885 A1 | 5/2006 | Brockmann et al. | |
| 2006/0104379 A1 | 5/2006 | Li et al. | |
| 2006/0109814 A1 | 5/2006 | Kuzminskiy et al. | |
| 2006/0120225 A1 | 6/2006 | Choi | |
| 2006/0140172 A1 | 6/2006 | Trainin | |
| 2006/0140290 A1 | 6/2006 | Li et al. | |
| 2006/0164972 A1 | 7/2006 | van Rensburg et al. | |
| 2006/0165114 A1 | 7/2006 | Diepstraten et al. | |
| 2006/0203935 A1 | 9/2006 | Li et al. | |
| 2006/0280116 A1 | 12/2006 | Ji et al. | |
| 2006/0286937 A1 | 12/2006 | Russell et al. | |
| 2006/0291439 A1 | 12/2006 | Yang et al. | |
| 2006/0291544 A1 | 12/2006 | Fischer et al. | |
| 2007/0077936 A1 | 4/2007 | Tomisawa et al. | |
| 2007/0153714 A1 | 7/2007 | Shapira et al. | |
| 2007/0153748 A1 | 7/2007 | Shapira | |
| 2007/0155353 A1 | 7/2007 | Shapira et al. | |
| 2007/0177681 A1 | 8/2007 | Choi et al. | |
| 2007/0280360 A1 | 12/2007 | Ihm et al. | |

OTHER PUBLICATIONS

Yoo et al., On the Optimality of Multi-Antenna Broadcast Scheduling Using Zero-Forcing Beamforming, pp. 1-13.

International Search Report for International Application No. PCT/IL06/01490 mailed Jun. 26, 2008.

International Search Report for International Application No. PCT/IL06/01491 mailed Aug. 5, 2008.

* cited by examiner

DEVICE, SYSTEM AND METHOD OF SECURING WIRELESS COMMUNICATION

CROSS REFERENCE TO RELATED APPLICATIONS

This application is a Continuation In Part Application of U.S. patent application Ser. No. 11/319,526, filed Dec. 29, 2005, the entire disclosure of which is incorporated herein by reference.

FIELD OF THE INVENTION

The invention generally relates to the field of wireless communication and, more particularly, to methods, devices and/or systems of securing communication in a wireless communication network, e.g., a wireless local area network (WLAN).

BACKGROUND OF THE INVENTION

A wireless communication network may include, for example, a wireless Access Point (AP) and multiple wireless communication stations able to communicate using a wireless medium. In non-secure communication systems, signals transmitted between the AP and the stations may be detected by outside listening parties and/or unauthorized users. This may raise a concern for secure wireless communication.

SUMMARY OF SOME DEMONSTRATIVE EMBODIMENTS OF THE INVENTION

Some demonstrative embodiments of the invention include methods, devices and/or systems to secure a wireless transmission.

According to some demonstrative embodiments of the invention, a method of securing wireless communication may include transmitting a noise transmission to be received by one or more destinations other than an intended destination of a packet during a time period corresponding to a duration of the packet.

According to some demonstrative embodiments of the invention, transmitting the noise transmission may include selectively transmitting the noise transmission based on at least one of the intended destination and an origin of the packet.

According to some demonstrative embodiments of the invention, selectively transmitting the noise transmission may include comparing at least one of an address representing the intended destination and an address representing the origin to a set of one or more predefined addresses.

According to some demonstrative embodiments of the invention, the method may include determining the time period based on at least one of a duration field and a length field of the packet.

According to some demonstrative embodiments of the invention, transmitting the noise transmission may include transmitting the noise transmission using a spatial division multiple access transmission scheme.

According to some demonstrative embodiments of the invention, transmitting the noise transmission may include, for example, transmitting a set of N spatial channels using a set of N respective antennas. The method may include, for example, generating the set of N channels by applying a precoding matrix to a set of inputs including a null-beam transmission and one or more dither sequences, wherein the precoding matrix includes a beamforming vector based on channel state information of the intended destination and one or more additional vectors orthogonal to the beamforming vector. The one or more dither sequences may include, for example, N−1 dither sequences; and/or the one or more additional vectors may include, for example, N−1 additional vectors.

According to some demonstrative embodiments of the invention, the method may include synchronizing the noise transmission to a fast-Fourier-transform window of the detected packet.

According to some demonstrative embodiments of the invention, an apparatus to secure wireless communication may include a transmission sentinel to transmit a noise transmission to be received by one or more destinations other than an intended destination of a packet during a time period corresponding to a duration of the packet.

According to some demonstrative embodiments of the invention, a wireless communication system may include one or more wireless communication devices to transmit and receive packets; and a transmission sentinel, e.g., as is described above.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
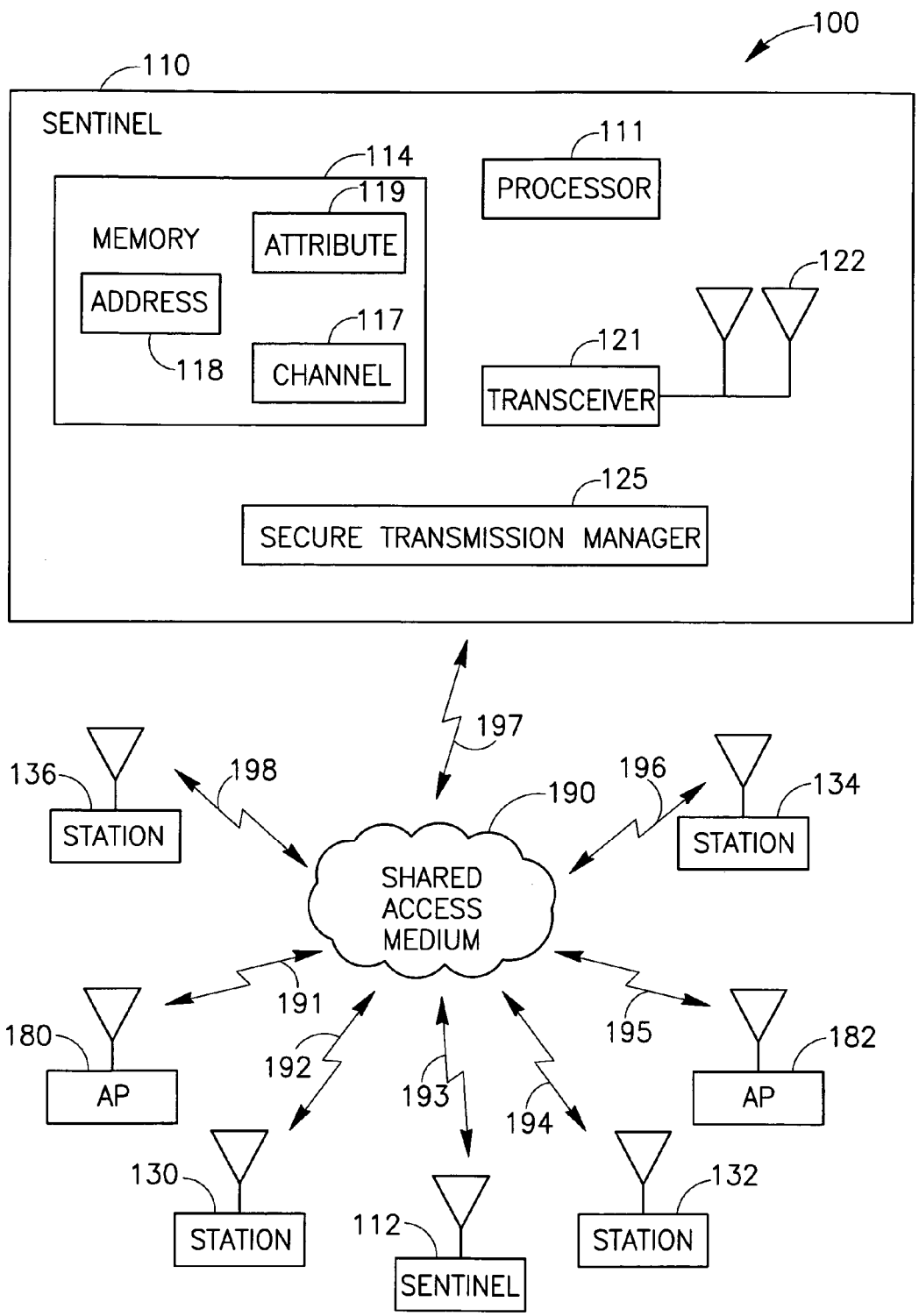
FIG. 1 is a schematic block diagram illustration of a wireless communication system including at least one transmission sentinel in accordance with some demonstrative embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF SOME DEMONSTRATIVE EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, parameters, or the like. For example, "a plurality of stations" may include two or more stations.

It should be understood that the present invention may be used in a variety of applications. Although the present invention is not limited in this respect, the circuits and techniques disclosed herein may be used in many apparatuses such as personal computers, stations of a radio system, wireless communication system, digital communication system, satellite communication system, and the like.

Stations intended to be included within the scope of the present invention include, by way of example only, wireless local area network (WLAN) stations, wireless personal area network (WPAN) stations, two-way radio stations, digital system stations, analog system stations, cellular radiotelephone stations, and the like.

Types of WLAN communication systems intended to be within the scope of the present invention include, although are not limited to, "IEEE-Std 802.11, 1999 Edition (ISO/IEC 8802-11: 1999)" standard ("the 802.11 standard"), and more particularly in "IEEE-Std 802.11b-1999 Supplement to 802.11-1999, Wireless LAN MAC and PHY specifications: Higher speed Physical Layer (PHY) extension in the 2.4 GHz band" ("the 802.11b standard"), "IEEE-Std 802.11a-1999, Higher speed Physical Layer (PHY) extension in the 5 GHz band" standard ("the 802.11a standard"), "IEEE-Std 802.11g-2003 Supplement to 802.11-1999, Wireless LAN MAC and PHY specifications: Further Higher Data Rate Extension in the 2.4 GHz band, Draft 8.2" standard ("the 802.11g standard"), and the like.

Types of WLAN stations intended to be within the scope of the present invention include, although are not limited to, stations for receiving and transmitting spread spectrum signals such as, for example, Frequency Hopping Spread Spectrum (FHSS), Direct Sequence Spread Spectrum (DSSS), Orthogonal Frequency-Division Multiplexing (OFDM) and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a local area network (LAN), a wide area network (WAN), or a global communication network, for example, the Internet.

Part of the discussion herein may relate, for exemplary purposes, to transmitting a packet, receiving a packet, detecting a packet, monitoring a packet, and/or securing the transmission of a packet. However, embodiments of the invention are not limited in this regard, and may include, for example, transmitting, receiving, detecting, monitoring and/or securing a signal, a block, a data portion, a symbol, a data sequence, a frame, a data signal, a preamble, a signal field, a content, an item, a message, or the like.

Reference is now made to FIG. 1, which schematically illustrates a block diagram of a wireless communication system 100 in accordance with some demonstrative embodiments of the invention.

System 100 may include, for example, one or more wireless communication devices, units and/or elements able to communicate over a shared access medium 190. For example, system 100 may include one or more Access Points (APs), e.g., AP 180 and/or AP 182; and/or one or more wireless communication stations, e.g., stations 130, 132, 134 and/or 136. Stations 130, 132, 134 and/or 136, and APs 180 and/or 182 may communicate over shared access medium 190, for example, through wireless communication links 192, 194, 196, 191, 196, and/or 198, respectively. Stations 130, 132, 134 and/or 136 may include, for example, a wireless communication station or a wireless communication device able to transmit and/or receive wireless communication signals, e.g., in accordance with the 802.11 standard or any other suitable wireless communication standard or protocol. APs 180 and/or 182 may include any suitable AP, e.g., as defied by the 802.11 standard or any other wireless communication standard or protocol.

Although the invention is not limited in this respect, in some demonstrative embodiments of the invention, stations 130 and 136 may communicate with AP 180; and stations 132 and 134 may communicate with AP 182. For example, stations 130 and 136 may be located within a coverage zone of AP 180; and/or stations 132 and 134 may be located within a coverage zone of AP 182.

According to some demonstrative embodiments of the invention, system 100 may also include one or more transmission sentinels, e.g., sentinels 110 and/or 112, to selectively secure and/or protect one or more transmissions over shared access medium 190, e.g., as described in detail below. Although the invention is not limited in this respect, sentinel 110 may selectively secure, for example, transmissions within a first secure coverage zone, e.g., including AP 182, and stations 132 and 134; and/or sentinel 112 may selectively secure, for example, transmissions within a second secure coverage zone, e.g., including AP 180, and stations 130 and 136. The first and/or second protection coverage zones may be configured or defined according to any suitable protection scheme. In one example, the first and second protection zones may overlap, partially or completely. In another example, the first and second protection coverage zones may be different from one another. System 100 may optionally include, for example, additional sentinels (not shown), e.g., to secure transmissions within one or more additional zones, areas, and/or locations, e.g., separate from and/or overlapping, partially or entirely, the first and/or second protection coverage zones. System 100 may optionally include other and/or additional components.

According to some demonstrative embodiments of the invention, sentinel 110 may include a secure transmission manager 125 to selectively secure the transmission of a packet, for example, by transmitting a noise transmission to be received by one or more destinations other than an intended destination of the packet, for example, during a time period corresponding to the duration of the packet, e.g., as described below.

According to some demonstrative embodiments of the invention, sentinel 110 may also include, for example, a processor 111, a memory 114, and a transceiver 121. Sentinel 110 may further include other suitable hardware components and/or software components.

Processor 111 may include, for example, a Central Processing Unit (CPU), a Digital Signal Processor (DSP), a microprocessor, a controller, a chip, a microchip, an Integrated Circuit (IC), or any other suitable multi-purpose or specific processor or controller. Processor 111 may, for example, process data received by sentinel 110, and/or process data intended for transmission by sentinel 110.

Memory 114 may include, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units. Memory 114 may store, for example, data received by sentinel 110, and/or data intended for transmission by sentinel 110. Memory 114 may also store, for example, one or more predefined addresses 118 representing one or more destination and/or origin addresses of transmissions to be secured, e.g., as described in detail below. Addresses 118 may be stored in any suitable configuration, arrangement, list, table, database, and the like. Addresses 118 may be in any suitable format, e.g., an address format in compliance with the 802.11 standard or any other suitable format or protocol.

Transceiver 121 may include, for example, a wireless Radio Frequency (RF) transceiver able to transmit and/or receive RF signals, e.g., through a plurality of antennas 122. Transceiver 121 may be implemented using a transmitter, a receiver, a transmitter-receiver, or one or more units able to perform separate or integrated functions of transmitting and/or receiving wireless communication signals, blocks, frames, transmission streams, packets, messages and/or data.

Although the invention is not limited in this respect, antennas 122 may include, for example, a set of N>1 antennas, e.g., suitable for Spatial division multiple access (SDMA) transmission. Antennas 122 may include, for example, an internal and/or external RF antenna, e.g., a dipole antenna, a monopole antenna, an omni-directional antenna, an end fed antenna, a circularly polarized antenna, a micro-strip antenna, a diversity antenna, or any other type of antenna suitable for transmitting and/or receiving wireless communication signals, blocks, frames, transmission streams, packets, messages and/or data.

According to some demonstrative embodiments of the invention, sentinels 110 and/or 112 may be able to detect and/or receive transmissions over shared access medium 190, e.g., using a wireless communication link 197. For example, sentinel 110 may be able to detect and/or receive transmissions within the first protection coverage zone, e.g., transmissions between AP 182 and stations 132 and 134. Sentinel 112 may detect and/or receive transmissions within the second secure coverage zone, e.g., transmissions between AP 191 and stations 130 and 136. Sentinels 110 and/or 112 may implement any suitable transmission reception, monitoring and/or detection configuration, mechanism, method and/or algorithm, e.g., as are well known in the art. Although the invention is not limited in this respect transmission sentinels 110 and/or 112 may include, may be part of, or may perform the functionality of an AP. In some demonstrative embodiments of the invention, sentinels 110 and/or 112 may include or may be part of a wireless communication device adapted to perform combined OFDM-SDMA transmission, e.g., as described below with reference to FIGS. 3 and/or 4.

According to some demonstrative embodiments of the invention, sentinel 110 may selectively secure transmissions transmitted by and/or intended to be received by a predefined set of one or more wireless communication devices ("the secured communication set"). The secured communication set may include, for example, one or more destination devices to which transmissions are to be secured, and/or one or more origin devices from which transmissions are to be secured, as described below.

According to some demonstrative embodiments of the invention, addresses 118 may include a set of address values corresponding to the wireless communication devices of the protected communication set. Although the invention is not limited in this respect, the secured communication set may be determined and/or updated, for example, by sentinel 110 and/or by any other suitable element or unit of system 100, based on any suitable criteria For example, sentinel 110 may update addresses 118, e.g., by adding one or more new addresses, and/or deleting one or more of addresses 118. For example, sentinel 110 may update addresses 118 to include an address corresponding to a wireless device which has entered the first secure coverage zone; and/or delete an address corresponding to a wireless device which has moved out of the first secure coverage zone.

In some demonstrative embodiments of the invention, memory 114 may optionally store one or more attributes 119 corresponding to addresses 118. Attributes 119 corresponding to an address of addresses 118 may include, for example one or more values indicating whether transmissions intended for the address and/or transmissions originating from the address are to be secured. For example, attributes 119 may include a first value indicating that transmissions to a corresponding address of addresses 118 are to be secured, a second value indicating the transmissions from the corresponding address are to be secured, and/or a third value indicating that both transmissions to and from the corresponding address are to be secured.

According to some demonstrative embodiments of the invention, manager 125 may determine whether the transmission of a packet detected by sentinel 110 ("the detected packet") is to be secured, e.g., based on an origin of the detected packet and/or a destination of the detected packet. Manager 125 may determine the origin and/or destination of the detected packet based, for example, based on one or more fields of the packet. For example, the detected packet may include a Media Access Control (MAC) header which may include, for example, a transmitter address (TA) field indicating an origin of the detected packet; and/or a receiver address (RA) field indicating an intended destination of the detected packet, e.g., as are defined by the 802.11 standard.

According to some demonstrative embodiments of the invention, manager 125 may determine whether the transmission of the detected packet is to be secured based, for example, on a comparison between the TA and/or RA fields of the detected packet; and addresses 118 and/or attributes 119. It may be desired to protect the transmission of detected packet, e.g., if one or more of the RA and TA fields of the detected packet are determined to match one or more of addresses 118. The determination of whether or not to protect the transmission of the detected packet may be based on any suitable securing criteria, e.g., as described below.

In one example, manager 125 may be adapted to secure transmissions to or from a predefined device, e.g., station 134; while not securing, for example, transmissions to or from one or more other devices, e.g., station 182 and/or AP 182. Accordingly, addresses 118 may include an address corresponding to the address of the predefined device, e.g., the address of station 134, and attributes 119 may indicate that both transmissions to and from the predefined device are to be secured. Manager 125 may determine the transmission of the detected packet is to be secured if, for example, the TA field and/or the RA field of the detected packet matches the address of station, e.g., if the detected packet was transmitted by station 134, or is intended to be received by station 134. Manager 125 may determine that the transmission of the detected packet is not to be secured if, for example, neither one of the TA and/or RA fields of the detected packet matches the address of station 134, e.g., if the detected packet was transmitted from AP 182 to station 182.

In another example, manager 125 may be adapted to secure transmissions intended to be received by a first device, e.g., station 134; to secure transmissions to and from a second device, e.g., AP 182; while not securing, for example, transmissions to or from one or more other devices, e.g., station 132. Accordingly, addresses 118 may include a first address corresponding to the address of the first device, e.g., the address of station 134; and a second address corresponding to the address of the second device, e.g., the address of AP 182. Attributes 119 corresponding to the first address may indicate that transmissions to the first device are to be secured, and/or attributes 119 corresponding to the second address may indicate both transmissions to and from the second device are to be secured. Manager 125 may determine the transmission of the detected packet is to be secured if, for example, the TA filed of the detected packet matches the first address; and/or if the RA address of the detected packet matches either one of the first and second addresses. Manager 125 may determine that the transmission of the detected packet is not to be secured if, for example, the TA and/or RA fields do not match addresses 118, and/or if attributes 119 do not indicate the transmission of the detected packet is to be secured, e.g., if the detected packet was transmitted to station 132 by an AP other than AP 182.

According to some demonstrative embodiments of the invention, manager 125 may determine the duration of the transmission of the detected packet, e.g., based on one or more fields of the detected packet. For example, manager 125 may determine the duration of the transmission of the detected packet based on a duration field, which may be part of the MAC header, e.g., as is defined by the 802.11 standard; and/or based on a length field which may be part of a Physical Layer Convergence Protocol (PLCP) header of the detected packet, e.g., as is defined by the 802.11 standard.

According to some demonstrative embodiments of the invention, manager 125 may selectively transmit a noise transmission to be received by one or more destinations other than the intended destination of the detected packet, e.g., based on determination whether or not the transmission of the detected packet is to be secured, as described in detailed below. For example, manager 125 may transmit the noise transmission if it is determined that the transmission of the detected packet is to be protected.

According to some demonstrative embodiments of the invention, manager 125 may transmit the noise transmission during a time period corresponding to the determined transmission duration of the detected packet. Thus, destinations other than the intended destination of the detected packet may receive the noise transmission transmitted by sentinel 110, e.g., during a time period at least partially overlapping the time period at which the intended destination receives the detected packet. Accordingly, it will be appreciated by those of ordinary skill in the art that the transmission of the detected packet may be substantially secured, e.g., from disclosure to the one or more other destinations, for example, while sentinel 110 transmits the noise transmission.

According to some demonstrative embodiments of the invention, memory 114 may also store channel state information 117 corresponding to one or more of addresses 118. Manger 125 may determine and/or update information 117 based, for example, on one or more transmissions from wireless devices corresponding to addresses 118, e.g., as described below.

In one demonstrative embodiment of the invention, manager 125 may determine the channel state information, for example, by exchanging Null-Data/Acknowledge (ACK) frames with the devices corresponding to addresses 118. For example, manager 125 may determine channel state information corresponding to station 134, channel state information corresponding to station 132, and/or channel state information corresponding to AP 182, e.g., by sending Null-Data frames and receiving ACK frames from station 134, station 132, and/or AP 182, respectively.

Accordance to some demonstrative embodiments of the invention, manager 125 may exchange the Null-Data/ACK frames with one or more devices corresponding to addresses 118, for example, during one or more predefined time periods, e.g., periodically. Manger 125 may estimate the spatial signatures corresponding to addresses 118 based on the received ACK frames. For example, manager 125 may receive a return ACK frame from a device ("the assessed device") at each of the N antennas 122, providing a replica of the received signal multiplied by a complex channel coefficient factor, denoted $h_i$ wherein i=1...N, known as the spatial signature of the assessed device. As is known in the art, the factor $h_i$ may be a representation of the channel between sentinel 110 and the assessed device. Optionally, the Null-Data/ACK exchange may be skipped to reduce network overhead, for example, if manager 125 already has an updated estimate for the spatial signature of the assessed device. Although the invention is not limited in this respect, an estimate may be considered up-to-date if it is obtained, e.g., within 10% of the channel coherence time. For example, in a slowly moving environment, channel coherence time may be around 300 milliseconds, and an estimate may be considered up-to-date if it is not more than 30 milliseconds old. As is known in the art, channel coherence time is a measure of the speed at which the channel characteristics change.

According to some demonstrative embodiments of the invention, manager 125 may determine the channel state information corresponding to one or more of addresses 118 based on the detected packet and/or one or more previously detected packet. For example, manager 125 may determine the channel state information corresponding to the origin of the detected packet by determining the factor $h_i$ corresponding to the detected packet. This channel state information may be used for example to perform a future noise transmission. Any other suitable method and/or algorithm may be implemented to determine and/or update channel state information 117. For example, sentinel 110 may determine the channel state information based on a Request to send/Clear to send (RTS/CTS) frame exchange between the origin and the destination devices of the detected packet if, for example, the origin and destination devices are configured to perform a RTS/CTS exchange prior to performing the transmission of the packet. The RTS/CTS exchange may include, for example, the origin device sending a RTS frame to the destination device, and the destination device replying by a CTS frame. Sentinel 110 may determine the channel state information of the destination device, for example, based on the CTS frame.

According to some demonstrative embodiments of the invention, manager 125 and/or sentinel 110 may be able to transmit the noise transmission such that the intended destination receives the detected packet, e.g., without substantially receiving the noise transmission, while the one or more other destinations receive the noise transmission. For example, manager 125 and/or sentinel 110 may implement an SDMA transmission scheme enabling selective transmission of the noise transmission to destinations other than the intended destination of the detected packet, for example, by selectively transmitting a null-beam or a zero-signal to the intended destination. The SDMA transmission scheme may be adapted to transmit, for example, a set of N spatial channels via antennas 122, respectively. The set of N channels may be generated, for example, by applying at least one precoding matrix to a set of inputs including the null-beam and one or more dither sequences. The precoding matrix may include, for example, a beamforming vector based on the channel state information of the intended destination and one or more additional vectors orthogonal to the beamforming vector, e.g., as described below with reference to FIGS. 3 and/or 4.

According to some demonstrative embodiments of the invention, one or more wireless communication devices of system 100, e.g., one or more of APs 180 and 182, and/or one or more of stations 130, 132, 134 and 136, may communicate using a frequency-based modulation, for example, OFDM modulation, e.g., as defined by the 802.11a and/or 802.11g standards. In these embodiments the precoding beamforming matrix may be applied in the frequency domain, e.g., in each frequency bin. A Cyclic Prefix (CP) may be inserted between each OFDM symbol, e.g., after applying an Inverse Fast Fourier Transform (IFFT) operation, in order for example, to guard against Inter Symbol Interference (ISI). It will be appreciated that the beams of the transmission may be orthogonal to one another during a data interval including the OFDM symbols, while during a CP interval including the CP one or more of the beams of the transmission may not orthogonal. Accordingly, the "null" operation of the null-beam may be more effective during the data interval than during the CP interval. However, a device receiving the transmission of sentinel 110 may discard the CP, and may set an FFT window to start immediately after the CP interval. Thus, it may be desired to synchronize the transmission of the noise transmission to the FFT window of the detected packet.

According to some demonstrative embodiments of the invention, sentinel 110 may align or synchronize the FFT window of the noise transmission to the FFT window of the detected packet, for example, in order to achieve synchronization, e.g., at the destination of the detected packet, between the null-beam of the noise transmission and the OFDM symbols of the detected packet. Sentinel 110 may be adapted to determine the location of the FFT window of the detected packet, e.g., based on a Preamble header of the detected packet. Sentinel 110 may then synchronize the transmission of the noise transmission to the determined FFT window location.

According to some demonstrative embodiments of the invention, manager 125 may be implemented, for example, as a hardware component, as a software component, as a combined hardware/software component, as part of processor 111, as part of transceiver 121, as a unit or sub-unit of sentinel 110, as part of a MAC module or MAC layer or MAC component of sentinel 110, as a communication driver, as a dedicated controller, as an Integrated Circuit (IC), or the like. In some embodiments, manager 125 may be operatively associated with, or may communicate with, one or more components of sentinel 110, for example, processor 111, transceiver 121, a MAC module, a MAC component, a MAC layer, other (e.g., upper) layers of sentinel 110, layers or components or controllers of sentinel 110 which may control or perform downlink and/or uplink scheduling, or the like.

Figure 2:
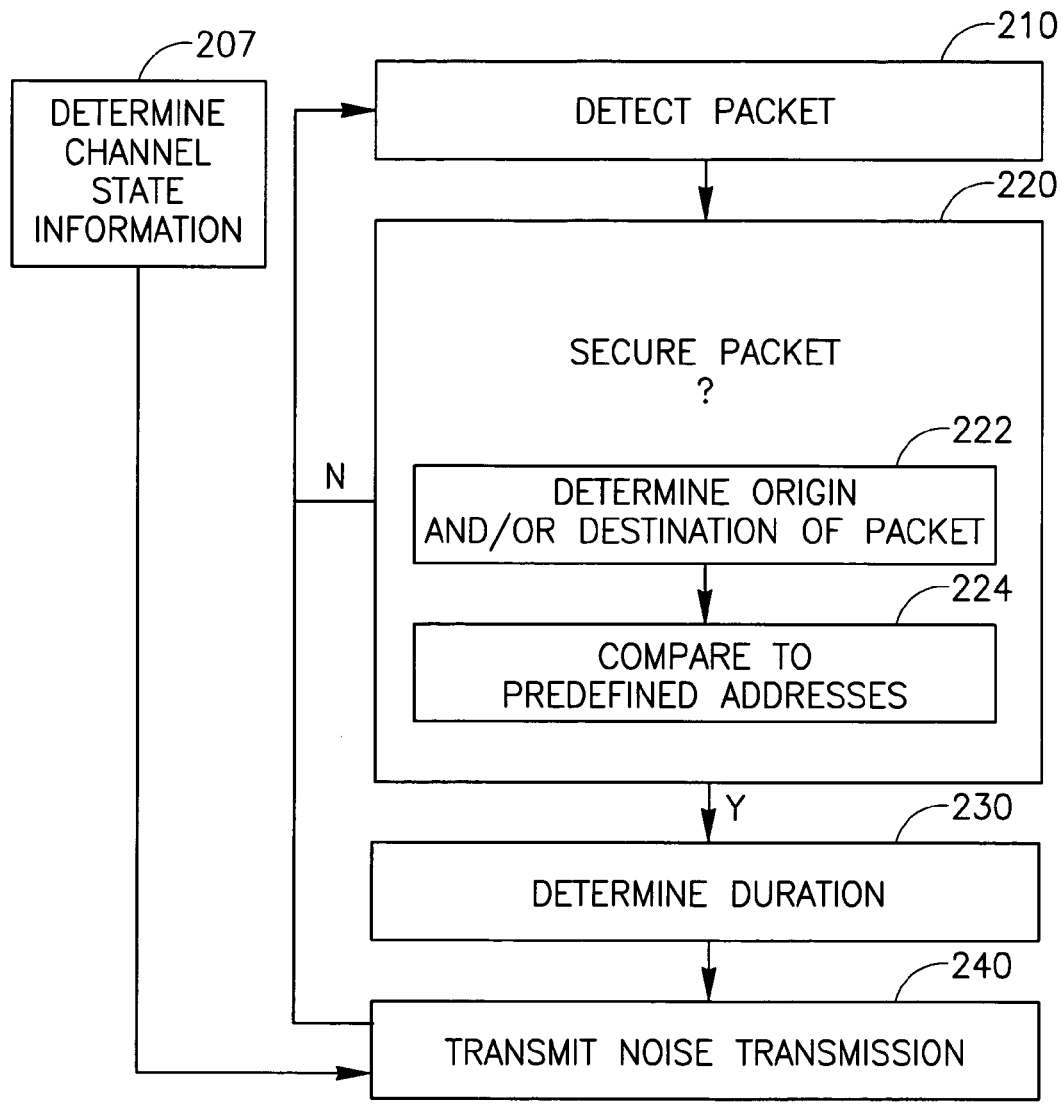
FIG. 2 is a schematic flow-chart of a method of securing wireless communication in accordance with some demonstrative embodiments of the invention.

Reference is now made to FIG. 2, which is a schematic flow-chart illustration of a method of protecting a transmission in accordance with some demonstrative embodiments of the invention. Operations of the method may be implemented, for example, by system 100 of FIG. 1, by sentinel 110 of FIG. 1, by manager 125 of FIG. 1, and/or by other suitable APs, transceivers, units, devices, and/or systems.

As indicated at block 210, the method may include, for example, detecting a packet transmitted from an origin to an intended destination. This may be performed, for example, by sentinel 110 (FIG. 1) and/or manager 125 (FIG. 1).

As indicated at block 220, the method may include, for example, determining whether the transmission of the detected packet is to be secured. For example, manager 125 (FIG. 1) may determine whether the transmission of the detected packet is to be secured, e.g., based on the origin and/or destination of the detected packet; one or more of addresses 118 (FIG. 1); and/or one or more of attributes 119 (FIG. 1).

As indicated at block 222, according to some demonstrative embodiments of the invention, the method may include determining an origin and/or a destination of the detected packet, e.g., based on the TA and/or the RA of the address. This may be performed, for example, by manager 125 (FIG. 1).

As indicated at block 224, the method may also include comparing the origin and/or destination of the detected packet to one or more predefined addresses. For example, manager 125 (FIG. 1) may compare the origin and/or destination to addresses 118 (FIG. 1). Manager 125 (FIG. 1) may determine whether the transmission of the detected packet is to be secured, e.g., based on addresses 118 (FIG. 1) and/or attributes 119 (FIG. 1), e.g., as described above.

As indicated at block 230, the method may include, determining the transmission duration of the detected packet, e.g., if it is determined that the transmission of the detected packet is to be secured. For example, manager 125 (FIG. 1) may determine the transmission duration of the detected packet based on one or more fields of the detected packet, e.g., as described above. The method may include detecting another packet, e.g., subsequent to the detected packet, for example, if it is determined that the transmission of the detected packet is not to be secured.

As indicated at block 240, the method may also include, for example, transmitting a noise transmission to be received by one or more destinations other than an intended destination of the detected packet, e.g., during a time period corresponding to the duration of the detected packet. For example, manager 125 (FIG. 1) and/or sentinel 110 (FIG. 1) may generate and/or transmit the noise transmission, e.g., as described above with reference to FIG. 1, and/or as described below with reference to FIGS. 3 and/or 4.

According to some demonstrative embodiments of the invention, the noise transmission may be generated based on channel state information e.g., related to the destination of the detected packet. As indicated at block 207, the method may also include, for example, determining and/or updating channel state information corresponding to one or more of the predefined addresses. For example, manager 125 (FIG. 1) and/or sentinel 110 (FIG. 1) may determine and/or update channel state information 117 (FIG. 1), e.g., based on one the detected packet, one or more Null-data/ACK exchanges, and/or one or more other transmissions, as described above.

One or more of the above operations may be repeated. Other suitable operations or sets of operations may be used in accordance with embodiments of the invention.

Figure 3:
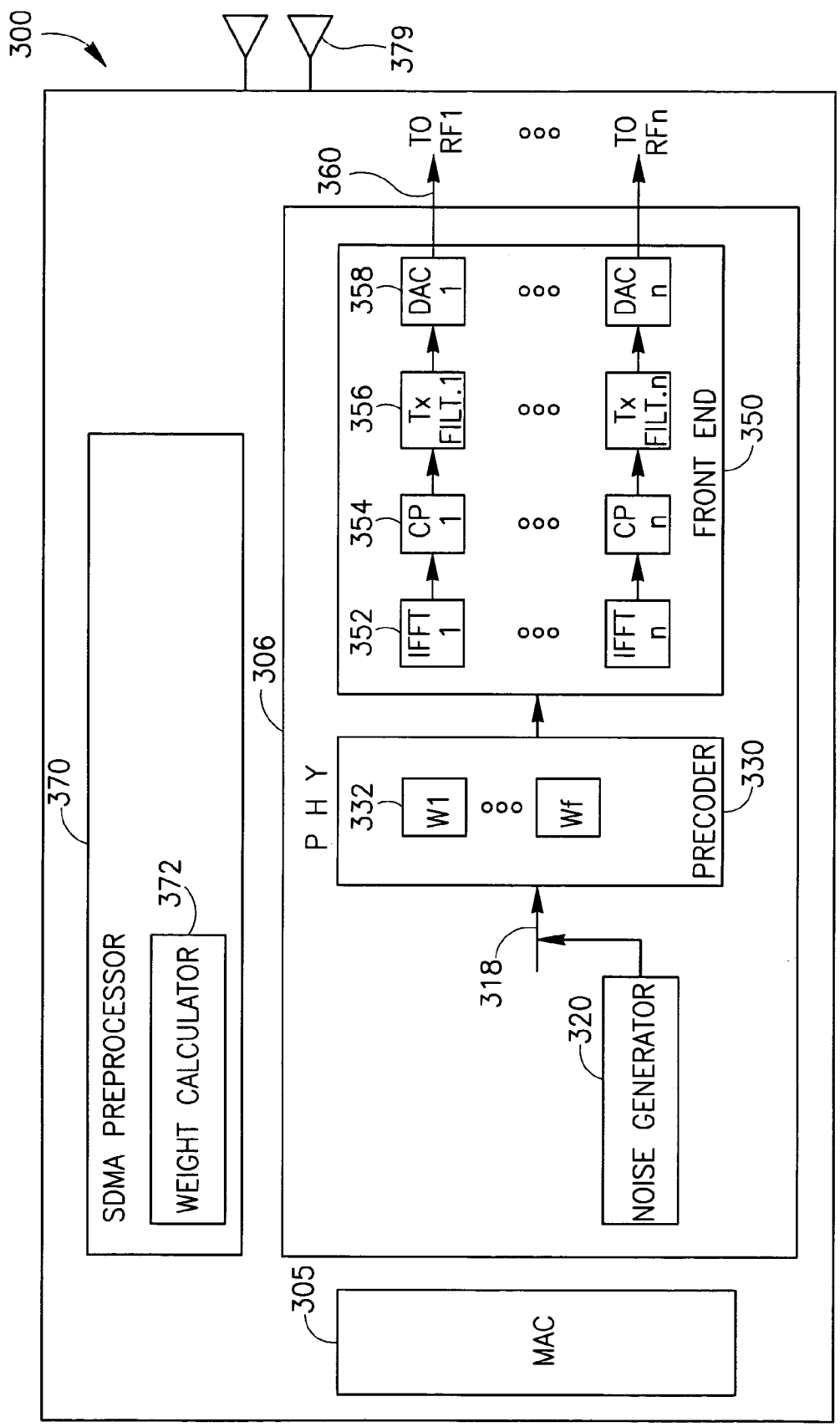
FIG. 3 is a schematic diagram of components of a wireless communication device able to generate a noise transmission in accordance with demonstrative embodiments of the invention.

Reference is made to FIG. 3, which schematically illustrates components of a wireless communication device 300 to generate a noise transmission in accordance with some demonstrative embodiments of the invention. Although the invention is not limited in this respect, one or more elements and/or units of device 300 may be implemented by, and/or may perform the functionality of, sentinel 110 (FIG. 1), processor 111 (FIG. 1), transceiver 121 (FIG. 1), manager 125 (FIG. 1), and/or memory 114 (FIG. 1).

According to some non-limiting demonstrative embodiments of the invention, device 300 may be adapted to perform combined OFDM-SDMA transmission. For example, simultaneous SDMA transmission using N transmit antennas may be performed independently for each frequency in an OFDM modulation scheme having F frequencies, as explained in detail below. It will be appreciated that other transmission schemes are possible, for example, SDMA may be combined with Direct Sequence Spread Spectrum (DSSS) signals used in the 802.11b standard, or any other suitable modulation scheme as is known in the art. For example, in a DSSS-SDMA transmission system, SDMA precoding may be performed in the time domain, as opposed to frequency domain precoding for the OFDM case.

Although the invention is not limited in this respect, device 300 may include a MAC 305, a Physical layer (PHY) 306, and/or a plurality of antennas 379. Device 300 may also include a SDMA preprocessor 370 to determine one or more preceding values to be applied to one or more transmissions, as described below. For example, preprocessor 370 may include one or more modules units, e.g., a weight calculation module 372 to calculate beamforming weights according to a beamforming scheme, as described in detail below. Although the invention is not limited in this respect, preprocessor 370 may include high-bandwidth inputs, e.g., for receiving channel estimates; and/or high-bandwidth outputs, e.g., for providing the precoding values. Preprocessor 370 may be implemented using any suitable combination of memory, hardwired logic, and/or general-purpose or special-purpose processors, as is known in the art. In accordance with different demonstrative embodiments of the invention, preprocessor 370 may be implemented as a separate entity or as subsystem of MAC 305 and/or PHY 306.

According to some demonstrative embodiments of the invention, device 300 may generate a noise transmission to be received by one or more destinations other than at least one predefined destination ("the intended destination"). Although the invention is not limited in this respect, the intended destination may include, for example, the destination of the detected packet, as described above with reference to FIGS. 1 and/or 2. Device 300 may generate, for example, a set of spatial channels, e.g., N spatial channels, to be transmitted, using antennas 379, by applying a preceding matrix to a set of inputs including at least one null (zero) input, e.g., a null-beam, to be transmitted to the at least one intended destination, respectively; and a set of dither sequences, e.g., up to N−1 dither sequences, as described in detail below. The precoding matrix may include, for example, at least one beamforming vector which may be based, for example, on channel state information of the at least one intended destination, respectively, and up to N−1 additional vectors orthogonal to the beamforming vector.

In accordance with some embodiments of the invention, device 300 may include a noise generator 320 to provide precoder 320 with at least one noise dither sequence, e.g., up to N−1 dither sequences. Although the invention is not limited in this respect, noise generator 320 may be implemented, for example, as part of PHY 306.

According to some demonstrative embodiments of the invention, precoder 330 may be provided, for example, with signals 318 including the at least one noise dither sequence generated by noise generator 302, and a zero (null) signal, which may be generated by any suitable signal generator, e.g., as is known in the art. Precoder 330 may map, for example, signals 318 into N antenna streams 340. For example, precoder 330 may apply to output 318 F orthogonal precoding matrices 332 corresponding to the F frequency bins used for OFDM, respectively.

In accordance with some demonstrative embodiments of the invention, one or more of precoding matrices 332 may include at least one beamforming vector corresponding to the at least one intended destination, respectively, and one or more additional vectors, e.g., up to N−1 additional vectors.

According to some demonstrative embodiments of the invention, one or more of the vectors may include a set of preceding values. For example, the beamforming vector and/or the additional vectors may include N preceding values. Accordingly, each one of matrices 332 may include, for example, an N×N matrix.

According to some demonstrative embodiments of the invention one or more of the precoding values may be determined, for example, by weight calculation module 372, e.g., as described below.

Antenna streams 340 may be processed by frontend 350, which may include N transmission branches.

Frontend 350 may include any suitable front end hardware and/or software, Although the invention is not limited in this respect, each branch of Frontend 350 may include, for example, an Inverse Fast Fourier Transform 352, a Cyclic Prefix (CP) insertion module 354, a transmission filter 356, and/or a Digital to Analog Converter (DAC), e.g., as are known in the art.

Figure 4:
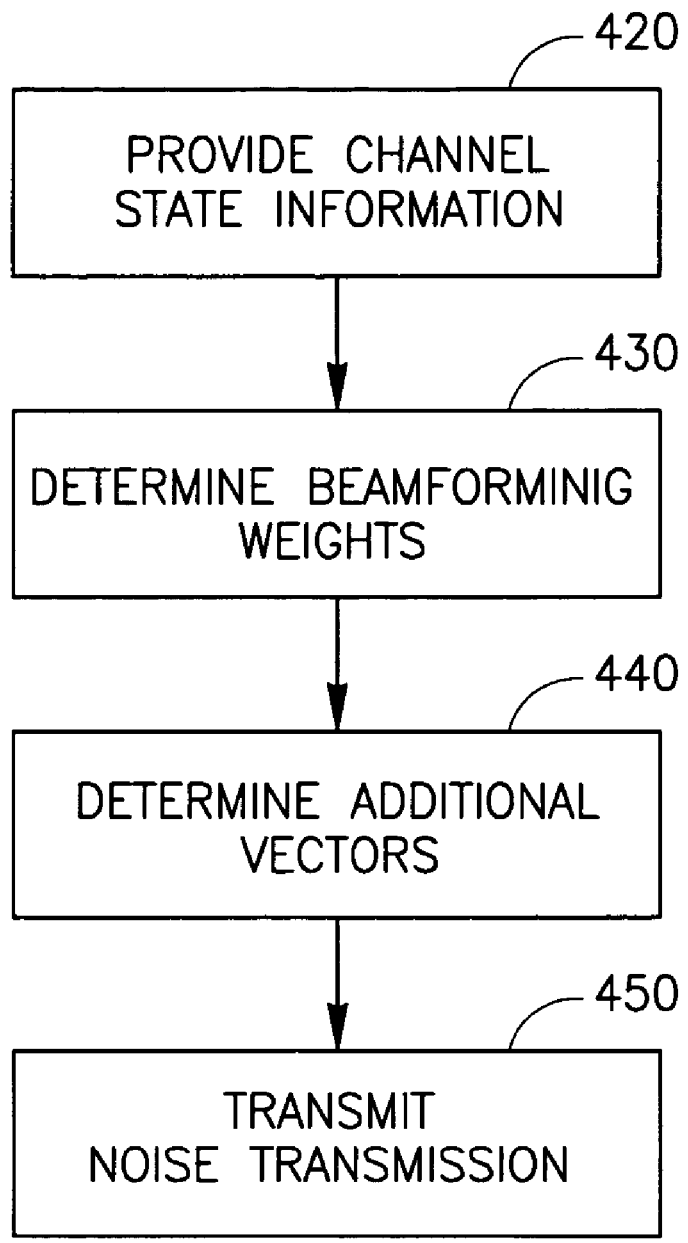
FIG. 4 is a schematic flowchart of a method of wireless transmission in accordance with some demonstrative embodiments of the invention.

Reference is made to FIG. 4, which schematically illustrates a wireless transmission method 400 in accordance with one demonstrative embodiment of the invention. Although the invention is not limited in this respect, transmission method 400 may be performed, e.g., by AP 300 (FIG. 3) to transmit a transmission, e.g., a noise transmission to one or more destinations other than the at least one intended destination.

As indicated at block 420, method 400 may optionally include providing channel state information of the intended destination. The channel state information may include, for example, channel state information 117 (FIG. 1), which may be determined and/or updated by sentinel 110 (FIG. 1), as described above with reference to FIG. 1.

As indicated at block 430, method 400 may include determining beamforming weights, e.g., to provide values for preceding matrix 332, as explained above with reference to FIG. 3. Although the invention is not limited in this respect, in the case of a single intended destination, e.g., the destination of the packet detected by sentinel 110 (FIG. 1), a beamforming weight vector corresponding to the spatial signature of the intended destination may be used. For example, a maximum ratio combining (MRC) vector may be calculated, e.g., by weight calculation module 372 (FIG. 3), by setting $w_i$ equal to the complex conjugate of $h_i$ for i=1 . . . N. It will be appreciated by those of skill in the art that a MRC vector corresponding to the spatial signature of the intended destination may provide an optimal set of weights for transmitting the null-beam to the intended destination, e.g., in terms of increasing SNR, as the signal may be maximized at the location of the intended destination.

As indicated at block 440, according to some embodiments of the invention, method 400 may include determining one or more, e.g., up to N−1, additional vectors orthogonal to the calculated beamforming vector, to represent noise dither sequences. For example, a Householder Transform technique, as is known in the art, may be used to supplement the precoding matrix, e.g., by complementing the calculated beamforming vector with an additional N−1 orthogonal vectors. Thus, the precoding matrix may represent up to N orthogonal spatial channels.

As indicated at block 450, method 400 may include transmitting the noise transmission, for example, by performing downlink SDMA transmission to the intended destination, e.g., as explained in detail above with reference to FIG. 3. Although the invention is not limited in this respect, the precoding matrices used by the PHY during the precoding stage of transmission may include values corresponding to the beamforming weights calculated at block 430.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by system 100 of FIG. 1, by sentinel 110 of FIG. 1, or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory 114), memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the true spirit of the invention.

What is claimed is:

1. A method of securing wireless communication, the method comprising:

transmitting, using a spatial division multiple access transmission scheme, a noise transmission to be received by one or more destinations other than an intended destination of a packet during a time period corresponding to a duration of said packet, wherein transmitting said noise transmission comprises transmitting a set of N spatial channels using a set of N respective antennas; and generating said set of N spatial channels by applying a precoding matrix to a set of inputs including a null-beam transmission and one or more dither sequences, wherein said precoding matrix includes a beamforming vector based on channel state information of said intended destination and one or more additional vectors orthogonal to said beamforming vector.

2. The method of claim 1, wherein transmitting said noise transmission comprises selectively transmitting said noise transmission based on at least one of said intended destination and an origin of said packet.

3. The method of claim 2 wherein said selectively transmitting comprises comparing at least one of an address representing said intended destination and an address representing said origin to a set of one or more predefined addresses.

4. The method of claim 1 comprising determining said time period based on at least one of a duration field and a length field of said packet.

5. The method of claim 1, wherein the one or more dither sequences include N−1 dither sequences, and said one or more additional vectors include N−1 additional vectors.

6. The method of claim 1 comprising synchronizing said noise transmission to a fast-Fourier-transform window of said detected packet.

7. An apparatus to secure wireless communication, the apparatus comprising:

a transmission sentinel to transmit a noise transmission to be received by one or more destinations other than an intended destination of a packet during a time period corresponding to a duration of said packet, wherein said sentinel comprises a spatial division multiple access transmission scheme to transmit said noise transmission and wherein said transmission scheme comprises a set of N antennas to transmit a set of N spatial channels, respectively, the sentinel comprising a channel generator to generate said set of N channels by applying a precoding matrix to a set of inputs including a null-beam transmission and one or more dither sequences, wherein said precoding matrix includes a beamforming vector based on channel state information of said intended destination and one or more additional vectors orthogonal to said beamforming vector.

8. The apparatus of claim 7, wherein said sentinel is able to selectively transmit said noise transmission based on at least one of said intended destination and an origin of said packet.

9. The apparatus of claim 8, wherein said sentinel is able to compare at least one of an address representing said intended destination and an address representing said origin to a set of one or more predefined addresses.

10. The apparatus of claim 7, wherein said sentinel is able to determine said time period based on at least one of a duration field and a length field of said packet.

11. The apparatus of claim 7, wherein the one or more dither sequences include N−1 dither sequences, and said one or more additional vectors include N−1 additional vectors.

12. The apparatus of claim 7, wherein said sentinel is able to synchronize said noise transmission to a fast-Fourier-transform window of said detected packet.

13. A wireless communication system comprising:
 one or more wireless communication devices to transmit and receive packets; and
 a transmission sentinel to transmit a noise transmission to be received by one or more destinations other than an intended destination station of a detected packet during a time period corresponding to a duration of said detected packet, wherein said sentinel comprises a spatial division multiple access transmission scheme to transmit said noise transmission and wherein said transmission scheme comprises a set of N antennas to transmit a set of N spatial channels, respectively, the sentinel comprising a channel generator to generate said set of N channels by applying a precoding matrix to a set of inputs including a null-beam transmission and one or more dither sequences, wherein said precoding matrix includes a beamforming vector based on channel state information of said intended destination and one or more additional vectors orthogonal to said beamforming vector.

14. The system of claim 13, wherein said sentinel is able to selectively transmit said noise transmission based on at least one of said intended destination and an origin of said packet.

15. The system of claim 14, wherein said sentinel is able to compare at least one of an address representing said intended destination and an address representing said origin to a set of one or more predefined addresses.

16. The system of claim 13, wherein said sentinel is able to determine said time period based on at least one of a duration field and a length field of said packet.

17. The system of claim 13, wherein said sentinel is able to synchronize said noise transmission to a fast-Fourier-transform window of said detected packet.

\* \* \* \* \*